Dec. 10, 1963 W. H. DORMAN ETAL 3,113,730
LUMINAIRE
Filed Feb. 15, 1962 4 Sheets-Sheet 1

INVENTORS
WILLIAM H. DORMAN
AND DARYL D. SULLIVAN
BY Clarence R Patty
ATTORNEY

Dec. 10, 1963 W. H. DORMAN ETAL 3,113,730
LUMINAIRE
Filed Feb. 15, 1962 4 Sheets-Sheet 2

INVENTORS
WILLIAM H. DORMAN
AND DARYL D. SULLIVAN

BY Clarence R Patty
ATTORNEY

INVENTORS
WILLIAM H. DORMAN
AND DARYL D. SULLIVAN
BY Clarence R. Patty
ATTORNEY

Dec. 10, 1963  W. H. DORMAN ETAL  3,113,730
LUMINAIRE
Filed Feb. 15, 1962  4 Sheets—Sheet 4

INVENTORS
WILLIAM H. DORMAN
AND DARYL D. SULLIVAN

BY Clarence R Patty Jr.
ATTORNEY

United States Patent Office 3,113,730
Patented Dec. 10, 1963

3,113,730
LUMINAIRE
William H. Dorman and Daryl D. Sullivan, Corning, N.Y., assignors to Corning Glass Works, Corning, N.Y., a corporation of New York
Filed Feb. 15, 1962, Ser. No. 173,406
4 Claims. (Cl. 240—106)

This invention relates to a luminaire adapted to distribute light along four discrete paths, for example, along four intersecting streets. In particular the invention relates to a refractor for use in such a luminaire.

It is an object of the invention to provide a luminaire of high efficiency which is capable of directing substantially all its light along four intersecting streets and from which substantially no light is lost in other directions.

This object is accomplished by the provision of a luminaire having a refractor which comprises a plurality of distinct surface areas, each area being one of two basic types. One of such types of area is composed of a series of parallel catadioptric prisms located on the outer surface of the refractor and adapted to split a beam of parallel rays into two divergent components; the other type is composed of two series of parallel prisms, the series being on opposite surfaces of the refractor, perpendicular to one another and respectively substantially parallel to or perpendicular to the intersecting streets. In its general outline the refractor itself is of the conventional concavo-convex form.

Figure 1:
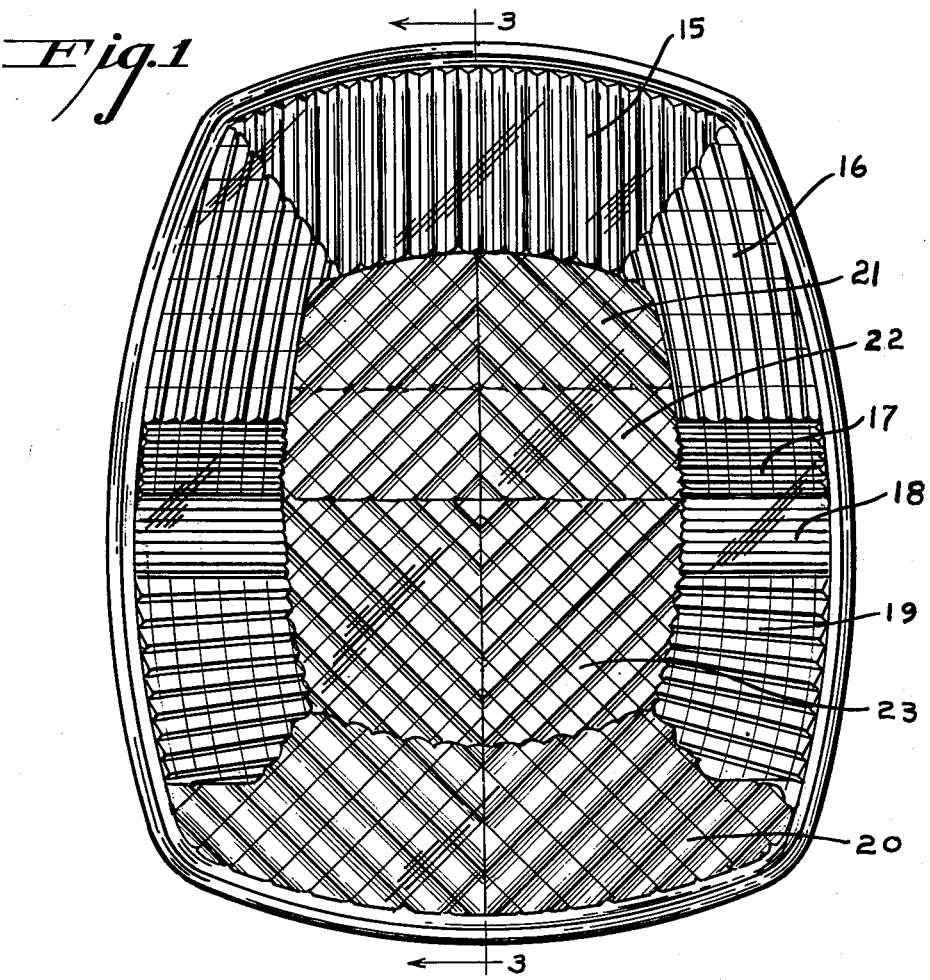
Figure 2:
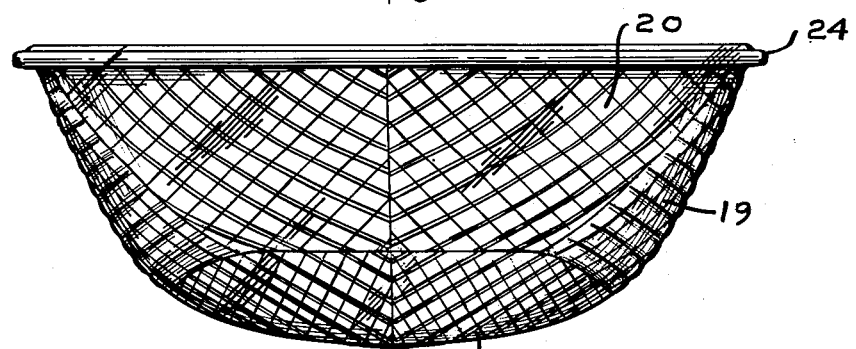
Figure 3:
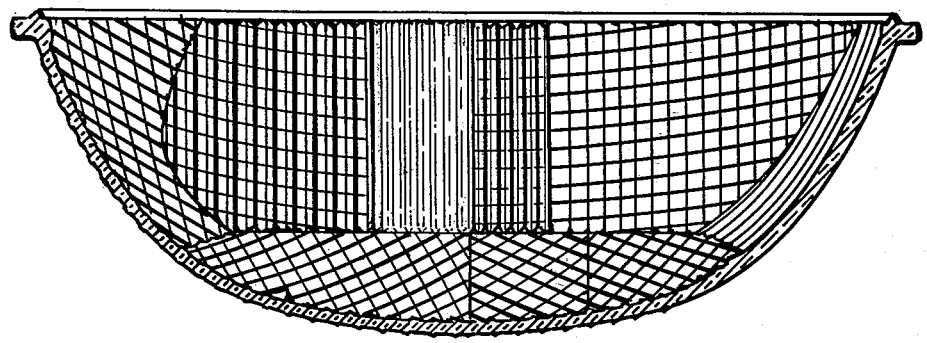
Figure 4:
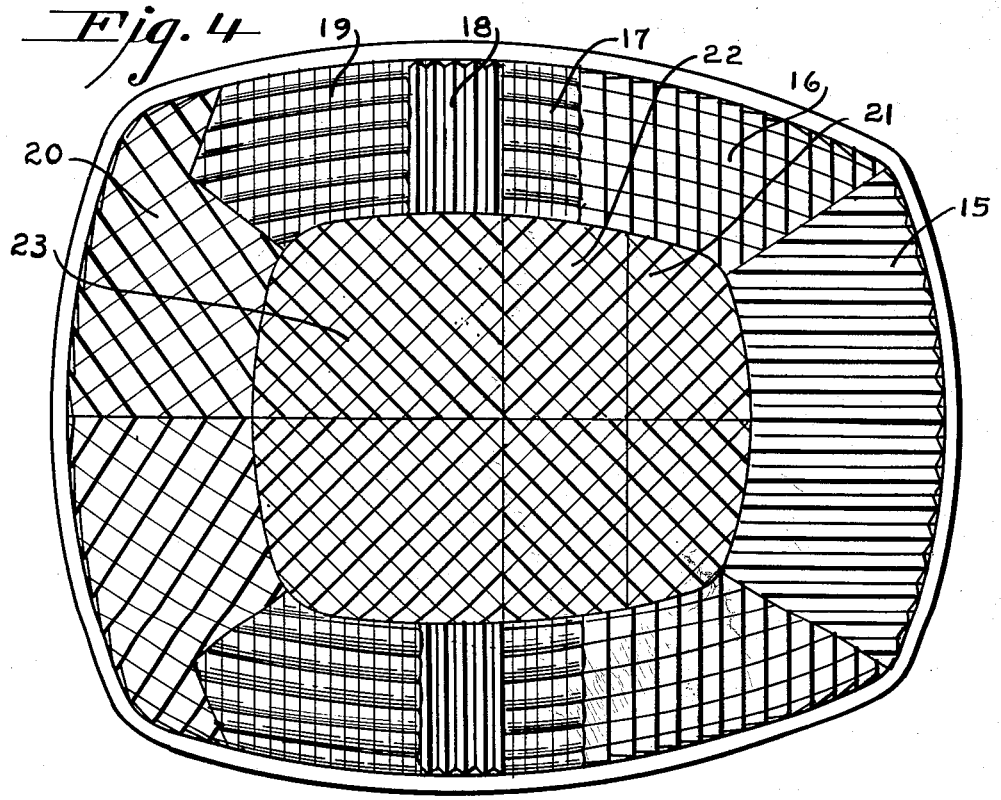
Figure 5:
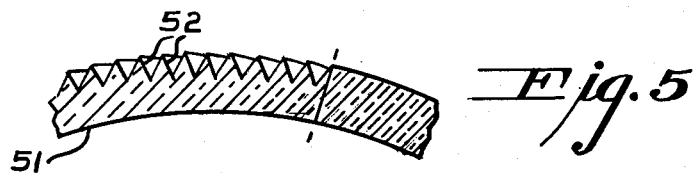
Figure 6:
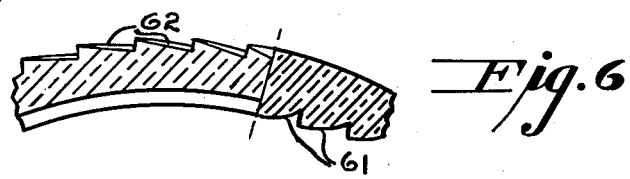
Figure 7:
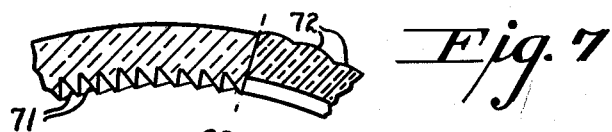
Figure 8:
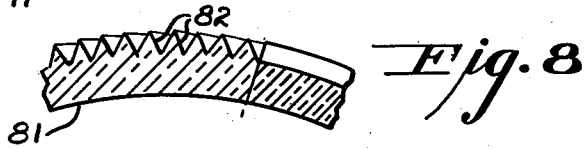
Figure 9:
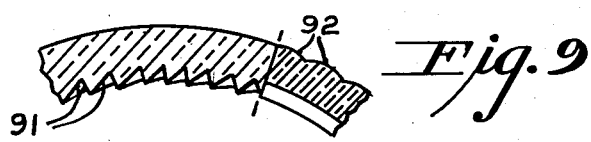
Figure 10:
Figures 11, 12, 13:
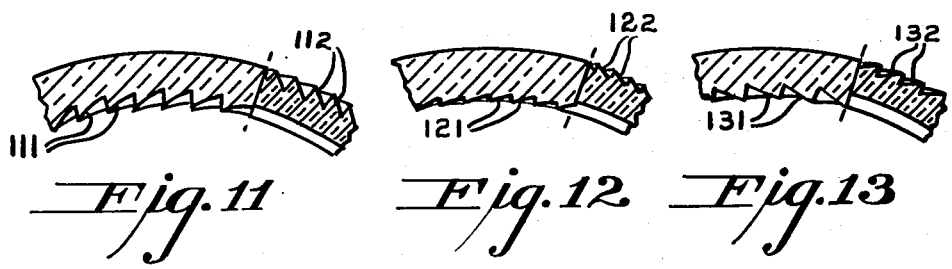
Figure 14:
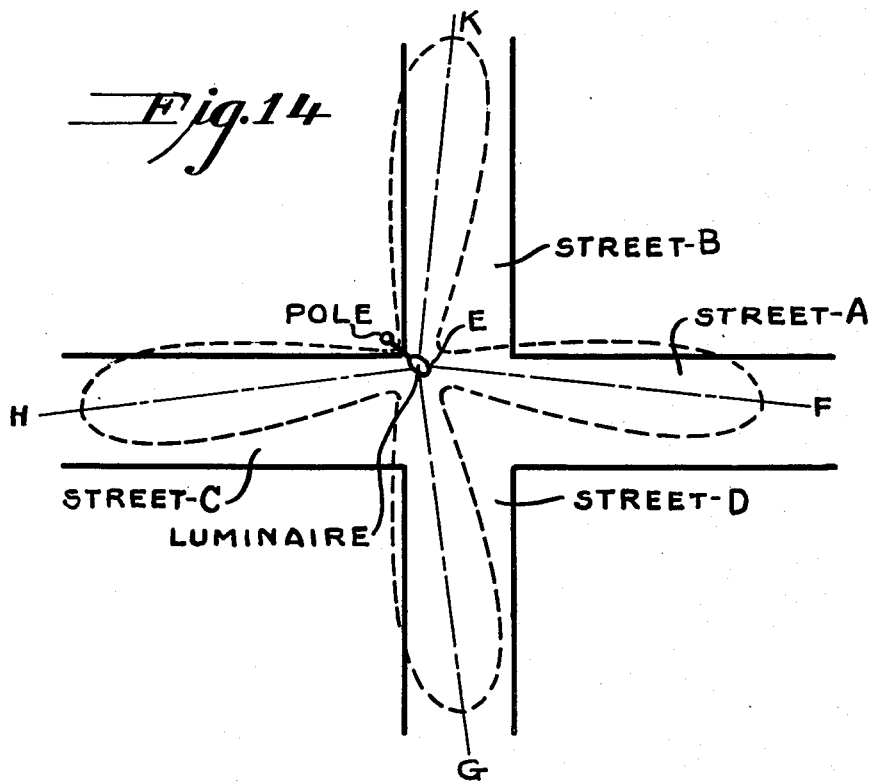
Figure 15:
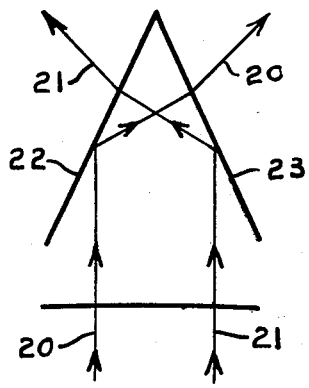
Figure 16:
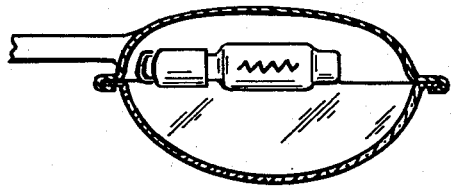

The construction of the refractor of the invention can be understood by reference to the following drawings, in which:

FIGURE 1 is a view of the concave surface of the refractor looking into the refractor, FIGURE 2 is an end view of the refractor, FIGURE 3 is a sectional view taken on line 3—3 of FIGURE 1, FIGURE 4 is a view of the convex surface of the refractor, FIGURE 5 is a perspective view of a fragmentary section of the refractor taken from area 15 of FIGURE 1, FIGURE 6 is a view similar to that of FIGURE 5 taken from area 16, FIGURE 7 is a view similar to that of FIGURE 5 taken from area 17, FIGURE 8 is a view similar to that of FIGURE 5 taken from area 18, FIGURE 9 is a view similar to that of FIGURE 5 taken from area 19, FIGURE 10 is a view similar to that of FIGURE 5 taken from area 20, FIGURE 11 is a view similar to that of FIGURE 5 taken from area 21, FIGURE 12 is a view similar to that of FIGURE 5 taken from area 22, FIGURE 13 is a view similar to that of FIGURE 5 taken from area 23, FIGURE 14 is a diagram of the pattern of the light distribution produced at a street intersection by a luminaire utilizing the present refractor, FIGURE 15 is a schematic view through a prism of the type found on the outer surface of sections 15 and 18 of the refractor, illustrating the paths of light rays passing therethrough, and FIGURE 16 is a sectional view of a luminaire utilizing the refractor of the invention.

Although the invention will be described as embodied in a refractor having a generally ovate form and intended for use with an ovate reflector, it will be apparent that variations from such a form may be made within the scope of the invention.

As previously stated, the present refractor is designed to produce four separate beams of light. Since it is intended that only one luminaire be used at each street intersection, and since it is convenient to suspend the luminaire near one corner of the intersection, the present luminaire is designed to produce four beams which are not precisely at right angles with one another, but which are oriented as indicated in FIGURE 14. This figure shows a luminaire suspended at point E in the intersection of streets A, B, C and D. The light distribution from the luminaire is illustrated by the broken lines. Lines OF, OK, OH, and OG indicate the direction of the center ray in each of the respective beams. It can be seen that these lines form acute angles with the respective streets. These angles vary depending upon the width of the streets, but for typical streets, the angles are approximately 10°, and in this case angles KOF, FOG, GOH and HOK are respectively 90°, 70°, 90° and 110°.

Referring to FIGURE 1, it can be seen that the present refractor comprises a plurality of surface areas. Since the refractor is symmetric about line 3—3 of FIGURE 1, the form of the various surface areas will be described with reference to areas 15-23, located on the right-hand side of this line of symmetry. During the discussion it should be kept in mind that the corresponding areas on the left-hand side of line 3—3 function in ways similar to those under discussion.

It has been shown that, in a typical situation, light emerging from the curb end of the luminaire, in order to fall upon the centers of streets B and C and not between them, must be caused to diverge by as much as 110° and that light emerging from the center of the sides of the refractor must be caused to diverge by as much as 90°. Efficient refraction of a magnitude sufficient to produce such divergence in a luminaire is difficult. It is for this reason that it was found advantageous to employ in these areas of the refractor prisms utilizing both reflection and refraction in order to deflect light by amounts sufficient to cause such divergence. These catadioptric prisms, illustrated in FIG. 15, comprise the first of the two previously-mentioned basic types of refractor areas, illustrated in the drawing by areas 15 and 18.

The configuration of areas 15 and 18 are illustrated respectively in section in FIGURES 5 and 8. Each of these areas comprises a smooth inner surface, 51 and 81 respectively, and an outer surface comprising a series of parallel catadioptric prisms, 52 and 82 respectively. The paths of rays of light passing through such prisms are illustrated in FIGURE 15. Rays 20 and 21 from the light source enter the refractor through the inner surface, are internally reflected at prism surfaces 22 and 23 respectively, and then emerge after being refracted by surfaces 23 and 22 respectively. By utilizing in this manner the principles of reflection and refraction a greater divergence can be effected between the two rays than can be effected by refraction only. Thus, by the application of well-known optical principles the angles at the vertices of the prisms can be calculated to give the desired divergence. In the illustrated embodiment, the refractor is designed to be mounted with line 3—3 of FIGURE 1 oriented diagonal to the intersection and rim 24 in a horizontal plane, as indicated in FIGURE 14, and with area 15, which will be referred to as the curb end of the refractor, facing the street corner nearest to the luminaire. By utilizing glass having an index of refraction of approximately 1.48 and by constructing the prisms of area 15 with vertex angles of 56° and those of area 18 with vertex angles of 47°, light emerging from these areas is caused to diverge at average angles of 110° and 90° respectively. Thus, light from area 15 is directed along streets B and C of FIGURE 14, and light from area 18 is directed along streets A and B.

The prisms of these areas are preferably oriented such that rays from the light source substantially bisect the vertex angles of the prisms. When areas 15 and 18 are intersected by vertical planes through the light center, the respective lines formed by the intersections of the planes with the inner and outer surfaces of the prisms are substantially parallel, and thus there is no substantial vertical redirection of light passing through these areas, the normal divergence of light emitted from the flight source being sufficient. Also the edges of the respective prisms lie in planes which are substantially vertical.

The remaining surface areas are of the second-mentioned type. While it is the function of areas 15 and 18 only to direct light so as to fall upon the intersecting streets, the remaining refractor surface areas perform a double function. It is their function to direct emergent light upon the intersecting streets and at the same time to spread it along the length of the streets. These respective functions are performed by two series of parallel prisms, one series on the refractor inner surface and the other on its outer surface. The prisms of the two series are respectively perpendicular to one another.

The arrangement of these prisms is illustrated in FIGURES 6, 7, 9, 10, 11, 12, and 13, which are sections taken respectively from areas 16, 17, 19, 20, 21, 22, and 23 of the refractor. Their orientation with respect to the refractor can be seen by reference to FIGURE 1. Since FIGURE 1 represents a view looking into the refractor, inner surface prisms are delineated by heavy lines, and those on the outer surface are delineated by light lines.

Although these various areas function in substantially similar ways, their structures and orientations differ somewhat, and therefore each area will be described separately.

Area 16, illustrated in perspective in FIGURE 6, has an inner surface comprising a series of prisms 61 having slightly curved convex surfaces and prism edges substantially parallel to rim 24 of the refractor. Prisms 61 have their maximum thicknesses at their edges nearer rim 24 and hence tend to refract light falling thereupon upwardly toward the rim and thus to cause it to fall at points at greater distances down street B than otherwise would occur. At the same time, the convexity of the prism surfaces causes the light to be spread out over an interval along street B (the convex prisms cause light rays passing therethrough initially to converge and then to cross and diverge due to the slight lateral separation of the rays compared with the length of their distance of travel before falling upon street B).

On the outer surface of area 16 is a series of prisms 62 which are oriented with their edges perpendicular to those of prisms 61. It is the function of these prisms to refract the light rays emitted from area 16 so that they fall upon the surface of street B. Consequently, since line OK forms an angle of approximately 55° with the major axis of the refractor (the major and minor axes may be taken respectively as lines 3—3 of FIG. 1 and a straight line in FIG. 1 which is coincident with the line separating areas 22 and 23), prisms 62 have their maximum thicknesses at their edges which are nearer a line on the refractor surface which line forms an angles of approximately 55° with the major axis in the direction of the curb end of the refractor. Thus the respective prisms refract light in the direction of this line and hence above street B. This arrangement can be seen in FIGURE 4.

Thus, the cumulative effect of the prisms of area 16 is to direct onto street B light which would otherwise fall beside the street and at the same time to spread the light along the length of the street.

Area 17, illustrated in section in perspective in FIGURE 7, has an inner surface comprising a series of prisms 71 and an outer surface comprising a series of curved prisms 72. Prisms 71 perform a function similar to that of prisms 62 of area 16; that is, they refract onto the surface of street B light which would otherwise fall between streets A and B. Since light passing through this area of the refractor must be bent through a greater angle in the horizontal than that from area 16, prisms 71 have their faces inclined at greater angles with the surface of the refractor than do prisms 62. Prisms 72 spread light along the length of street B.

Light passing through area 19 is directed along street A of FIGURE 14. This area has on its outer surface a plurality of curved prisms 92, illustrated in FIGURE 9, similar to prisms 72 of area 17, which prisms spread light along the length of street A. On the inner surface of area 19 are a series of prisms 91 having their minimum thicknesses along their edges nearer to the curb end of the refractor. Hence, light which would otherwise fall between streets A and B is refracted onto street A by prisms 91. The refracting power of prisms 91 decreases with increasing distance from the curb end of the refractor.

Area 20, illustrated in FIGURE 10, has an inner surface comprising a plurality of prisms 101 which are similar to prisms 61 of area 16, and which function in a similar manner to direct light along the length of street A. Prisms 102, on the outer surface of area 20, perpendicular to prisms 101, reflect onto street A light which would otherwise fall between streets A and D. The refracting power of prisms 102 increases with increasing distance from the curb end of the refractor.

Areas 21, 22 and 23, which, together with the adjacent areas symmetric therewith, comprise the base portion of the refractor, function mainly to distribute throughout the intersection light which would otherwise be concentrated directly beneath the refractor. The prisms of the respective surfaces of area 23 are perpendicular to those of areas 21 and 22. As can be seen from FIGURES 2 and 3, the surfaces of the base portion are nearly horizontal while those of the curb end portion and those of the side portion, which term is used herein to include all areas of the refractor except the base portion and the curb end portion, are substantially more nearly vertical.

Area 21, illustrated in FIGURE 11, has an inner surface comprising a plurality of prisms 111, each of which has its maximum thickness at its edge which is farther from the center of the refractor, and thus light passing therethrough is refracted through the intersection in a direction toward street B. As indicated in FIGURE 11, these prisms have their surfaces slightly curved in order not only to direct light toward street B, but also to spread the light along an interval. Prisms 112, perpendicular to prisms 111, are thickest at their respective edges which are farther from the curb end of the refractor and thus direct onto the streets light which would otherwise fall at the side thereof.

Area 22, illustrated in FIGURE 12, comprises prisms 121 and 122, which are respectively similar to prisms 111 and 112 of area 21, except that their respective refracting powers are less than those of area 21, since less refraction is required to direct into the intersection and onto the streets light passing near the center of the refractor.

Area 23, illustrated in FIGURE 13, has an inner surface comprising prisms 131 having their thicker portions located at their respective edges located farther from the center of the refractor, and thus these prisms bend rays in a direction toward street A. Prisms 132, perpendicular to prisms 131, are thicker at their edges farther from the curb end portion of the refractor and thus direct onto the street light which would otherwise fall at the side thereof.

It should be understood that the term "prism" is not used herein in its strict geometric sense, since the structures so described are not composed solely of plane surfaces but are of necessity curved to fit the generally ovate contour of the refractor. In addition, these structures sometimes have surfaces which are curved in cross section.

The refractor of this invention is particularly well adapted for use in conjunction with the reflector disclosed in copending application Serial No. 130,868, filed on August 11, 1961. This reflector, although generally ovate in shape, is formed so as to be optically round in planes parallel to its rim. Thus, when the present refractor is used with such a reflector, all light travelling from the light center and impinging on any given point on the refractor has the same horizontal direction regardless of whether it has travelled directly from the light center or whether it has first been reflected. As a consequence, all light originating at the light center and falling on the refractor is deflected through the same horizontal angle. Since a primary advantage of this refractor is its accurate horizontal distribution, the advantage of such a combination will be readily apparent.

As a variation on the present invention, it will be apparent that, in cases where less deflection is required than that necessitated by a four-way intersection, the present refractor may be utilized without the need for catadioptric prisms. For example, at a five-way intersection a refractor according to the invention could be employed utilizing only surface areas of the second-mentioned basic type.

We claim:

1. A refractor for use in illuminating from a single light source four streets intersecting substantially at right angles, said refractor comprising a base portion comprising four areas, each of said areas having an inner surface and an outer surface, each said inner surface comprising a series of parallel prisms and each said outer surface comprising a series of parallel prisms, the prisms on the outer surface of each area being perpendicular to the prisms on the inner surface of the same area, the prisms of each surface of each said area being perependicular to the prisms of one surface of each other said area and parallel to the prisms on the opposite surface of the same other said area, said areas of said base portion comprising respectively the four quadrants formed by two intersecting straight lines, and said prisms of said areas of said base portion forming angles of 45° with said lines, a curb end portion having a smooth inner surface and having an outer surface comprising a series of parallel catadioptric prisms having edges lying in a series of planes substantially perpendicular to said base portion, and two side portions, each said side portion comprising a plurality of areas, each of said areas comprising an inner surface and an outer surface, the outer surface of each area comprising a series of parallel prisms and the inner surface of each said area comprising a series of parallel prisms, the prisms of the outer surface of each area being perpendicular to the prisms of the inner surface of the same area, in each said area of said side portion the prisms on one surface thereof having their maximum thicknesses along their edges nearest a plane which plane is substantially perpendicular to said base portion and forms angles of approximately 45° with said intersecting straight lines of said base portion and passes through said area, and the prisms on the opposite surface of said area having their maximum thicknesses along their edges farthest from said base portion.

2. A refractor according to claim 1 in which each said side portion contains an area having a smooth inner surface and an outer surface comprising a plurality of parallel catadioptric prisms having edges lying in a series of parallel planes substantially perpendicular to said base portion of said refractor, said areas being opposite one another on said refractor.

3. A luminaire for use in illuminating from a single light source four streets intersecting substantially at right angles, said luminaire comprising a reflector, a light source and a refractor, said refractor being generally ovate in form and having a surface divided into a substantially horizontal base portion comprising four areas, each of said areas having an inner surface and an outer surface, the inner surface of each said areas comprising a series of parallel prisms and the outer surface of each of said areas comprising a series of parallel prisms, the prisms of the outer surface of each area being perpendicular to the prisms of the inner surface of the same area, the prisms on each surface of each area being perpendicular to the prisms on one surface of each other said area of said base portion and parallel to the prisms on the opposite surface of the same other said area of said base portion, said areas of said base portion comprising respectively the four quadrants formed by two intersecting straight lines and said prisms forming angles of 45° with said lines, a curb end portion having a smooth inner surface and having an outer surface comprising a series of parallel catadioptric prisms having edges lying in a series of planes substantially perpendicular to said base portion and two side portions, each said side portion comprising a plurality of areas, each of said areas comprising an inner surface and an outer surface, said inner surface of each area comprising a series of parallel prisms and said outer surface of each area comprising a series of parallel prisms, the prisms of the outer surface of each said area being perpendicular to the prisms of the inner surface of the same area, one of said series of prisms in each area having their maximum thicknesses along their edges nearest a plane substantially perpendicular to said base portion and forming angles of approximately 45° with said intersecting straight lines of said base portion and passing through said area, and the other of said series of prisms having their maximum thicknesses along their edges farthest from said base portion.

4. A refractor of a generally ovate concavo-convex form comprising a rim, a curb end portion, a bottom portion, and two side portions, each of said portions comprising at least one area, each of said areas having an inner surface and an outer surface, said refractor being symmetric about the major axis and having a minor axis perpendicular to said major axis and substantially bisecting said refractor, said curb end portion comprising a smooth inner surface and an outer surface having thereon a plurality of catadioptric prisms having edges lying in planes substantially parallel to said major axis, said base portion comprising four areas, each of said areas having an inner surface and an outer surface, said surfaces comprising respectively a first series of parallel prisms and a second series of parallel prisms perpendicular to said first series, one said series in each said area being perpendicular to one of said series in each of said remaining areas, and each said side portion comprising a first area located adjacent to said minor axis and in a direction away from said curb end portion, said first area comprising a smooth inner surface and an outer surface having thereon a plurality of catadioptric prisms having edges lying in planes substantially parallel to said minor axis, a second area between said minor axis and said curb end portion and adjacent to said curb end portion comprising an inner surface having thereon a series of prisms substantially parallel to said rim and having their maximum thicknesses at their edges nearest said rim and an outer surface comprising a series of prisms substantially perpendicular to said prisms on said inner surface of said second area, said prisms on said outer surface having maximum thicknesses at their edges nearest a line perpendicular to said rim, a third area between said minor axis and said second area and adjacent to each and having on its inner surface a series of parallel prisms perpendicular to said rim and having maximum thicknesses at their edges nearest said second area and on its outer surface a series of prisms substantially parallel to said rim and having curved surfaces, a fourth area adjacent to said first area having on its inner surface a series of prisms substantially perpendicular to said rim and having minimum thicknesses at their edges nearest said first area and having on its outer surface a series of prisms substantially parallel to said rim and having curved surfaces, and a fifth area between said fourth area and said major axis and adjacent to each and having on its inner surface a series of prisms substantially parallel to said prisms on said outer surface of said fourth area, said inner surface prisms having curved surfaces and having maximum thicknesses at their edges nearest said rim, and on the outer surface of said fifth area a series of prisms substantially perpendicular to those on its inner surface and having minimum thicknesses at their edges nearest said rim.

References Cited in the file of this patent

UNITED STATES PATENTS

| | | |
|---|---|---|
| 563,836 | Blondel et al. | July 14, 1896 |
| 804,254 | Mygott | Nov. 14, 1905 |
| 1,596,006 | Dorey | Aug. 17, 1926 |
| 2,006,509 | Myers | July 2, 1935 |
| 2,814,723 | Franck et al. | Nov. 26, 1957 |

OTHER REFERENCES

"Theory and Design of Illuminating Engineering Equipment," Jolley, Waldram and Wilson,, John Wiley and Sons, 1931, chapter 24, pages 297–317.